United States Patent [19]

Bühler et al.

[11] 4,381,262
[45] Apr. 26, 1983

[54] WATER-INSOLUBLE AZO DYESTUFFS, THEIR MANUFACTURE AND THEIR USE

[75] Inventors: Ulrich Bühler, Schöneck; Dieter Cornelius, Darmstadt; Rudolf Löwenfeld, Dreieich; Uwe Kosubek, Büttelborn; Reinhard Hähnle, Königstein; Rudolf Schickfluss, Kelkheim, all of Fed. Rep. of Germany

[73] Assignee: Cassella Aktiengesellschaft, Frankfurt am Main Fechenheim, Fed. Rep. of Germany

[21] Appl. No.: 349,574

[22] Filed: Feb. 17, 1982

Related U.S. Application Data

[63] Continuation of Ser. No. 241,586, Mar. 9, 1981.

[30] Foreign Application Priority Data

Mar. 13, 1980 [DE] Fed. Rep. of Germany ....... 3009635

[51] Int. Cl.³ .............................................. C09B 29/08
[52] U.S. Cl. .................................. 260/207.1; 260/208; 564/305; 564/441
[58] Field of Search ..................................... 260/207.1

[56] References Cited

U.S. PATENT DOCUMENTS

4,045,430  8/1977  Hamprecht ................ 260/207.1 X

FOREIGN PATENT DOCUMENTS

2234465  1/1974  Fed. Rep. of Germany ... 260/207.1

*Primary Examiner*—John Doll
*Attorney, Agent, or Firm*—Connolly and Hutz

[57] ABSTRACT

An azo dyestuff of the formula

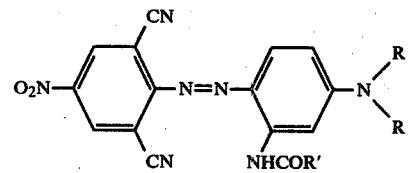

wherein R is linear alkyl having 2 to 4 carbon atoms and R' is linear alkyl having 3 to 5 carbon atoms and isopropyl.

4 Claims, No Drawings

WATER-INSOLUBLE AZO DYESTUFFS, THEIR MANUFACTURE AND THEIR USE

This application is a continuation of application Ser. No. 241,586 filed Mar. 9, 1981.

The present invention relates to valuable, new, water-insoluble azo dyestuffs which are free from ionic groups and have the general formula I:

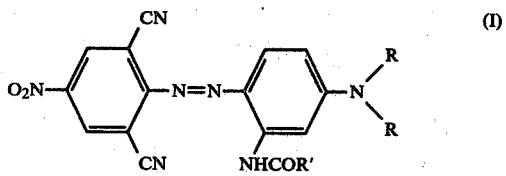

in which R denotes linear alkyl having 2 to 4 C atoms and R' denotes linear alkyl having 3 to 5 C atoms and isopropyl.

Preferred dyestuffs of the general formula I are those in which R denotes ethyl, n-propyl or n-butyl and those in which R' denotes n-butyl, n-pentyl and particularly n-propyl or i-propyl.

The dyestuff of the general formula I in which R denotes ethyl and R' denotes n-propyl, and the dyestuff of the general formula I in which R denotes ethyl and R' denotes i-propyl, are particularly preferred.

The dyestuff of the formula

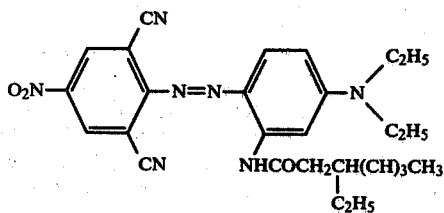

is described in German Auslegeschrift No. 1,963,735. This dyestuff only produces dyeings and prints which are relatively pale in colour.

The dyestuff, described in German Pat. No. 1,290,915, of the formula

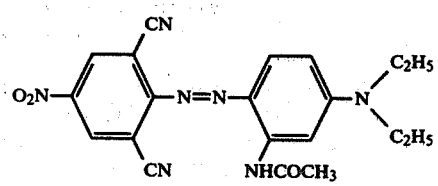

does indeed produce deep dyeings and prints. However, it exhibits, particularly in HT dyeing, a striking sensitivity to temperature, that is to say it builds up distinctly more weakly at 125° C. than at 130° C. and is also exhausted less efficiently.

This sensitivity to temperature is largely eliminated in the case of the dyestuff mixtures described in German Auslegeschrift No. 2,234,465. As a rule, these mixtures of dyestuffs have a better affinity than each individual dyestuff from which this mixture is formulated.

However, the manufacture and use of dyestuff mixtures of this type involves distinct disadvantages compared with individual dyestuffs: difficulties arise, for example, in adjusting the mixing ratio, in finishing and in shading off.

In view of the difficulties which arise with the above-mentioned, known, comparable dyestuffs and mixtures thereof, it was not to be foreseen and was very surprising that the dyestuffs, according to the invention, of the formula I should possess, as individual dyestuffs, an affinity surpassing that of the dyestuff mixtures of German Auslegeschrift No. 2,234,465.

The azo dyestuffs according to the invention are manufactured by subjecting azo dyestuffs of the formula II

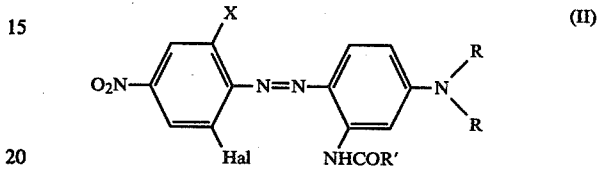

in which R and R' have the meanings given above, X denotes cyano or Hal and Hal denotes a halogen atom, particularly chlorine or bromine, to a nucleophilic exchange reaction, in a manner which is in itself known, for example as specified in the instructions of German Offenlegungsschriften Nos. 1,809,920 or 1,809,921, British Pat. No. 1,184,825, German Auslegeschrift No. 1,544,563, German Offenlegungsschrift No. 2,310,745, German Auslegeschrift No. 2,456,495, German Auslegeschrift No. 2,610,675, German Offenlegungsschriften Nos. 2,724,116, 2,724,117, 2,834,137, 2,931,081 or 2,341,109, U.S. Pat. No. 3,821,195 or German Offenlegungsschriften Nos. 2,715,034 or 2,134,896, the nucleophilic agent employed being the cyanide ion $CN^{\ominus}$.

The solvents employed for the exchange reaction are inert organic solvents, such as, for example, nitrobenzene or glycol monomethyl or monoethyl ethers or diglycol monomethyl or monoethyl ethers or mixtures of such solvents with one another and with tertiary organic nitrogen bases, dipolar, aprotic solvents, such as, for example, methylpyrrolidone, pyridine, dimethylformamide or dimethyl sulphoxide, dicyanodialkyl thioethers, water or aqueous systems consisting of water and an organic solvent (for example nitrobenzene) which is immiscible with water, preferably in the presence of a wetting agent or dispersing agent or of a known phase transfer catalyst or systems consisting of water and a water-soluble, inert, organic solvent, such as ethylene glycol or dimethylformamide.

The presence of organic basic nitrogen compounds, such as, for example, pyridine and pyridine bases, also has a favourable effect on the exchange reaction.

The reaction temperatures are normally between 20 and 150° C.

The nucleophilic agent $CN^{\ominus}$ is added to the reaction in the form of a metal cyanide, optionally a complex metal cyanide, such as, for example, an alkali metal cyanide or alkaline earth metal cyanide, zinc cyanide or an alkali metal cyanozincate or cyanoferrate, but preferably in the form of copper-I cyanide or a system which forms copper-I cyanide. The use of a combination of an alkali metal cyanide and copper-I cyanide has proved particularly effective, and the ratio of alkali metal salt and copper salt can be varied within wide limits.

The customary range of the alkali metal cyanide/copper-I cyanide ratio is 5:95 to 95:5. The advantageous effect of the components on one another can still be observed even outside these limits. It is also possible, of course, to replace the copper-I cyanide in its turn by a system which forms copper-I cyanide, such as, for example, a combination of an alkali metal cyanide and another copper salt, preferably a copper-I salt, such as, for example, a copper-I halide.

The dyestuffs of the formula II which are required for the manufacture of the dyestuffs according to the invention can be prepared by coupling a diazonium compound of an aromatic amine of the general formula III

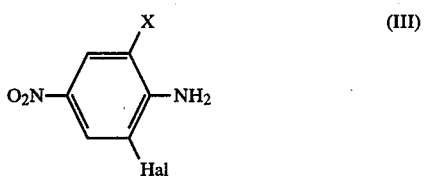

with a coupling component of the general formula IV

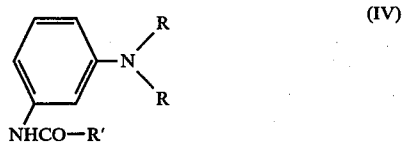

wherein R and R' have the meanings indicated above.

The diazonium compounds are obtained from the amines of the general formula III in a manner which is in itself known by treatment with nitrous acid or other systems which form nitrosonium ions, in an acid aqueous medium, a lower alkanecarboxylic acid, such as, for example, formic acid, acetic acid or propionic acid or mixtures thereof, or an organic solvent, at temperatures from 0° to 40° C.

The coupling is also carried out in a manner which is in itself known by combining the resulting diazo solution with a solution of the coupling component at temperatures from 0° to 40° C., preferably 0° to 25° C., in a suitable solvent, such as, for example, an alkanol having 1 to 4 C atoms or dimethylformamide, preferably in water acidified with sulphuric acid, hydrochloric acid or phosphoric acid, or a lower alkanecarboxylic acid which optionally contains water, or a mixture of lower alkanecarboxylic acids, if appropriate, also in the presence of an alkanol of limited miscibility with water. In some cases it can be appropriate to buffer the pH value during the coupling reaction, for example by adding sodium acetate. The coupling is complete after a few hours and the dyestuff of the formula II can be isolated and dried in a customary manner.

Coupling components of the formula IV which are required can be prepared by known processes from known commercial products.

Individually, or when mixed with one another or when mixed with other disperse dyestuffs, the azo dyestuffs according to the invention are excellently suitable for dyeing and printing hydrophobic synthetic materials.

The following are suitable hydrophobic synthetic materials: cellulose 2½-acetate, cellulose triacetate, polyamides and, particularly, high-molecular polyesters, such as, for example, polyethylene glycol terephthalate.

The dyestuffs according to the invention are preferably employed for dyeing and printing materials made from high-molecular polyesters, particularly those based on polyethylene glycol terephthalates, or mixtures thereof with natural fibrous substances, or materials made from cellulose triacetate. These materials can be in the form of sheet-like or filamentous structures and can be processed, for example, to give yarns or woven or knitted textile materials. The dyeing of the said fibre material with the dyestuffs according to the invention is effected in a manner which is in itself known, preferably from an aqueous suspension, if appropriate in the presence of carriers, at between 80° and approx. 110° C. using the exhaustion process or, using the HT process, in a dyeing autoclave at 110° to 140° C., and also using the so-called thermofixing process, the goods being padded with the dye liquor and then being fixed at about 180° to 230° C. The said materials can be printed by a procedure in which the goods which have been printed with printing pastes containing dyestuffs according to the invention are treated with HT steam, superheated steam or dry heat at temperatures between 80° and 230° C., if appropriate in the presence of a carrier, in order to fix the dyestuff. Very deep blue dyeings and prints which have very good fastness properties, particularly very good fastness to light and sublimation, are obtained in this way.

The dyestuffs according to the invention are also suitable for dyeing the hydrophobic materials listed above from organic solvents by the methods known for this purpose, and for mass coloration.

The dyestuffs according to the invention should be in as finely divided a state as possible in the dye liquors and printing pastes employed in the above applications.

The dyestuffs are brought into a finely divided state in a manner which is in itself known, by suspending the dyestuff produced in the course of manufacture, together with dispersing agents, in a liquid medium, preferably water, and exposing the mixture to the action of shearing forces, in the course of which the dyestuff particles originally present are comminuted mechanically to such an extent that an optimum specific surface is achieved and the sedimentation of the dyestuff is as low as possible. The particle sizes of the dyestuffs are, in general, between 0.5 and 5μ, preferably about 1μ.

The dispersing agents concomitantly used in the grinding process can be nonionic or anionic. Examples of nonionic dispersing agents are reaction products of alkylene oxides, such as, for example, ethylene oxide or propylene oxide, with compounds which can be alkylated, such as, for example, fatty alcohols, fatty amines, fatty acids, phenols, alkylphenols and carboxylic acid amides. Examples of anionic dispersing agents are ligninsulphonates, alkylsulphonates or alkylarylsulphonates or alkylaryl polyglycol ether-sulphates.

The dyestuff preparations thus obtained should be pourable for most modes of application. The content of dyestuff and dispersing agent is, therefore, limited in these cases. In general, the dispersions are formulated to a dyestuff content of up to 40 percent by weight and a content of dispersing agent of up to about 25%. For economic reasons, dyestuff contents of 15 percent by weight are usually not exceeded.

The dispersions can also contain, in addition, further auxiliaries, for example auxiliaries which act as oxidising agents, such as, for example, sodium m-nitrobenzensulphonate, or fungicidal agents, such as, for example, sodium o-phenylphenate and sodium pentachlorophenate.

The dyestuff dispersions thus obtained can be used very advantageously for preparing printing pastes and dye liquors. They offer particular advantages, for example, in the continuous processes in which the dyestuff concentration of the dye liquors must be kept constant by continuously feeding dyestuff into the apparatus while the latter is running.

For certain fields of application, powder formulations are preferred. These powders contain the dyestuff, the dispersing agent and other auxiliaries, such as, for example, wetting agents, oxidising agents, preservatives and anti-dust agents.

A preferred process for the production of pulverulent dyestuff preparations consists of removing the liquid from the liquid dyestuff dispersions described above, for example by vacuum-drying, freeze-drying, drying on cylinder driers and, preferably, spray-drying.

Dye liquors are prepared by diluting the necessary quantities of the dyestuff preparations produced in accordance with the above instructions, with the dyeing medium, preferably with water, to such an extent that the liquor resulting for the dyeing process has a ratio of 1:5 to 1:50. In addition, further dyeing auxiliaries, such as dispersing auxiliaries, wetting auxiliaries and fixing auxiliaries, are generally added to the liquors.

If the dyestuff is to be used for textile printing, the required quantities of the dyestuff formulations are kneaded, together with thickeners, such as, for example, alkali metal alginates or the like and, if appropriate, further additives, such as, for example, fixing accelerators, wetting agents and oxidising agents, to give printing pastes.

The invention is illustrated in greater detail by means of the examples which follow. Percentages are percentages by weight.

EXAMPLE 1

18.0 g of copper-I cyanide are stirred in 200 ml of dimethylsulphoxide together with 2.0 g of sodium cyanide, for 15 minutes at room temperature. 54.1 g of the dyestuff of the formula

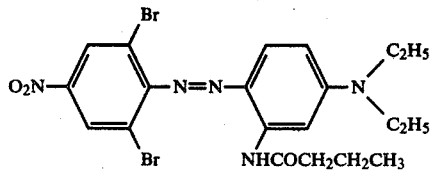

are then introduced and the mixture is heated at 110° C. to 115° C. for 15 minutes. The mixture is stirred until it is cold and the product is filtered off, washed with dimethylsulphoxide, water, 5% strength aqueous ammonia and again with water and dried under reduced pressure.

The dyestuff of the formula

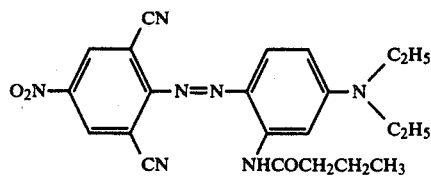

which melts at 189°–191° C., is obtained in this manner.

0.6 g of the dyestuff thus obtained is stirred in a finely dispersed form into 2,000 g of water. The pH of the dispersion is adjusted to a value of 5–6 with acetic acid, and 4.0 g of ammonium sulphate and 2.0 g of a commercially available dispersing agent based on a naphthalenesulphonic acid/formaldehyde condensation product are added.

100 g of a polyester fabric based on polyethylene glycol terephthalate are introduced into the dye liquor thus obtained, and dyeing is carried out for 1 hour at 130° C.

Subsequent rinsing, reductive after-treatment with a 0.2% strength sodium dithionite solution for 15 minutes at 70° to 80° C., rinsing and drying gives a deep blue dyeing which has very good tinctorial properties.

A dyeing of the same depth of colour is obtained if dyeing is carried out at 125° C. under conditions which are otherwise identical. Exhaustion tests carried out at 135° C. produce a nearly colourless fabric.

EXAMPLE 2

If, instead of the dyestuff of the formula II, 54.1 g of the dyestuff of the formula IV

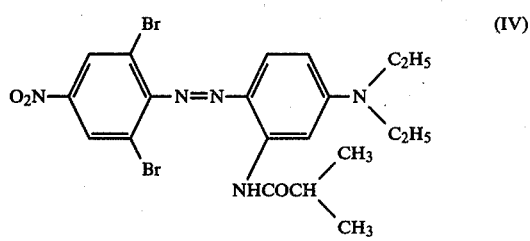

are reacted and isolated as described in Example 1, the dyestuff of the formula V

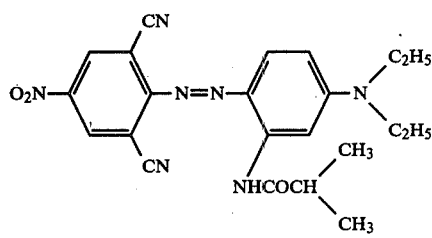

which melts at 216°–217° C., is obtained.

20.0 g of the dyestuff thus obtained are incorporated in the form of a fine dispersion into a printing paste containing 45.0 g of locust bean flour, 6.0 g of sodium 3-nitrobenzensulphonate and 3.0 g of citric acid per 1,000 g. If polyester is printed with this printing paste, and if, after drying, the printed fabric is steamed for 15 minutes at a steam pressure of 1.5 atmospheres gauge, rinsed, soaped and again rinsed and dried, a deep blue print which has very good tinctorial properties is obtained.

Further dyestuffs according to the invention which also produce, on polyester materials, deep blue dyeings and/or prints which also have very good tinctorial properties, are indicated in the following table.

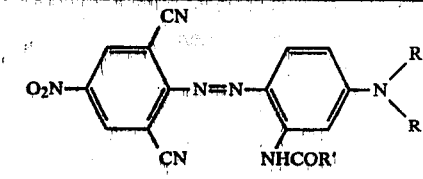

| Example | R | R' | Melting point (°C.) |
|---|---|---|---|
| 3 | $C_2H_5$ | $n\text{-}C_4H_9$ | 204–205 |
| 4 | $C_2H_5$ | $n\text{-}C_5H_{11}$ | 194–196 |
| 5 | $C_3H_7$ | $i\text{-}C_3H_7$ | 201–203 |
| 6 | $C_3H_7$ | $n\text{-}C_3H_7$ | 187–190 |
| 7 | $C_3H_7$ | $n\text{-}C_4H_9$ | 195–197 |
| 8 | $C_3H_7$ | $n\text{-}C_5H_{11}$ | 184–185 |
| 9 | $C_4H_9$ | $i\text{-}C_3H_7$ | 198–200 |
| 10 | $C_4H_9$ | $n\text{-}C_3H_7$ | 181–183 |
| 11 | $C_4H_9$ | $n\text{-}C_4H_9$ | 175–178 |
| 12 | $C_4H_9$ | $n\text{-}C_5H_{11}$ | 170 |

What is claimed is:

1. An azo dyestuff of the formula

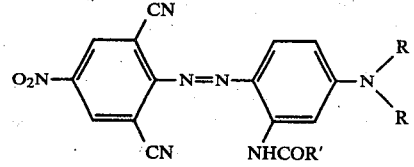

wherein R is a linear alkyl having 2 to 4 carbon atoms and R' is a linear alkyl having 3 to 5 carbon atoms or isopropyl.

2. A dyestuff according to claim 1 wherein R' is n-propyl or isopropyl.

3. A dyestuff according to claim 1 wherein R is ethyl and R' is n-propyl.

4. A dyestuff according to claim 1 wherein R is ethyl and R' is isopropyl.

* * * * *